(12) United States Patent  (10) Patent No.: US 7,652,470 B2
Spratte  (45) Date of Patent: Jan. 26, 2010

(54) BALL AND SLEEVE JOINT FOR A MOTOR VEHICLE

(75) Inventor: Joachim Spratte, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 599 days.

(21) Appl. No.: 10/596,353

(22) PCT Filed: Dec. 8, 2004

(86) PCT No.: PCT/DE2004/002694

§ 371 (c)(1),
(2), (4) Date: Jun. 9, 2006

(87) PCT Pub. No.: WO2005/057028

PCT Pub. Date: Jun. 23, 2005

(65) Prior Publication Data

US 2009/0016811 A1    Jan. 15, 2009

(30) Foreign Application Priority Data

Dec. 12, 2003    (DE) .................... 103 58 763

(51) Int. Cl.
*G01B 7/30* (2006.01)

(52) U.S. Cl. .................... 324/207.21; 324/207.25

(58) Field of Classification Search ......... 324/173–174, 324/207.2–207.25
See application file for complete search history.

(56) References Cited

U.S. PATENT DOCUMENTS 4,639,668 A * 1/1987 Petit et al. ............. 324/207.26
5,831,554 A * 11/1998 Hedayat et al. ............... 341/20

FOREIGN PATENT DOCUMENTS

| DE | 10023602 | 11/2001 |
| DE | 10110738 | 11/2002 |
| EP | 0617206 | 9/1994 |
| EP | 1001179 | 5/2000 |

* cited by examiner

*Primary Examiner*—Jay M Patidar
(74) *Attorney, Agent, or Firm*—McGlew and Tuttle, P.C.

(57) ABSTRACT

A ball and sleeve joint for a motor vehicle has a housing (1) and a ball sleeve (5) which extends out of the housing (1) on both sides. The ball sleeve (5), has a through hole (8) and a bearing area (4) and is mounted with the bearing area (4) in the housing (1). Two joint parts, which are rotatable and pivotable in relation to one another, are formed by the ball sleeve (5) and the housing (1). A sensor (13), which interacts with a signal transmitter (2) arranged at the other joint part, is arranged at one of the joint parts. Both the sensor (13) and the signal transmitter (2) are arranged between the through hole (8) and the housing (1).

20 Claims, 2 Drawing Sheets

BALL AND SLEEVE JOINT FOR A MOTOR VEHICLE

CROSS REFERENCE TO RELATED APPLICATIONS

This application is a United States National Phase application of International Application PCT/DE04/002694 and claims the benefit of priority under 35 U.S.C. § 119 of German Patent Application DE 103 58 763.2 filed Dec. 12, 2003, the entire contents of which are incorporated herein by reference.

FIELD OF THE INVENTION

The present invention pertains to a ball and sleeve joint for a motor vehicle, with a housing and with a ball sleeve, which extends out of the housing on both sides, has a through hole and a bearing area and is mounted in the housing with the bearing area such that two joint parts that are rotatable and pivotable in relation to one another are formed by the ball sleeve and the housing.

BACKGROUND OF THE INVENTION

Such a ball and sleeve joint is known from the state of the art. For example, DE 100 23 602 C2 discloses a ball and sleeve joint with a joint housing, with a ball sleeve provided with a spherically designed bearing surface and with a bearing shell, which surrounds the bearing surface and is received in a recess of the bearing housing, wherein the ball sleeve is provided with a through hole and extends out of the housing on both sides.

In modern vehicles, e.g., in vehicles with gas discharge lamps (for example, xenon headlights) and in vehicles with level control, the spring compression of the vehicle is regularly detected via the spring compression angle of a sensor, which is also called level sensor. This sensor is installed as a separate assembly unit in the wheel housing and is connected to a control arm via a linkage. The drawback of this procedure is that additional components are needed, which require, firstly, much space for their installation, and are, secondly, rather prone to damage by stone chips. Thirdly, the assembly effort needed is rather high, and adjusting steps are necessary.

Efforts have therefore been made for some time now to replace the level sensor in its known form by a sensor that is integrated in a ball and socket joint, which is regularly used in chassis of motor vehicles.

A ball and socket joint with a ball socket connected to a housing and with a ball head connected to a pin, which ball and socket joint is mounted rotatably in the housing, is known from EP 0 617 260 A1. A permanent magnet, opposite which a magnetic sensor arranged in the housing is located, is arranged in the ball head. The magnetic dipole of the permanent magnet is directed at right angles to the longitudinal axis of the ball pin, and a bellows is provided for protecting the ball and socket joint against environmental effects. The permanent magnet is also rotated by a rotation of the ball head in the ball socket, so that the magnetic field changes in relation to the magnetic field-sensitive sensor, and a position signal is generated. The three-dimensional motions occurring additionally can be used for control purposes in case of corresponding evaluation.

A ball and socket joint with a housing section and with a ball pin, which has a pin section and a ball section and is mounted rotatably and pivotably with its ball section in a mount provided in the housing section, is known from DE 101 10 738 C1. A permanent magnet is arranged in the ball section in a radial orientation in relation to the center of the ball section, and a magnetic field-sensitive sensor element is integrated in the mount. The permanent magnet moves relative to the sensor element during a rotary motion of the ball section, so that the relative rotation position of the ball section in the mount can be detected.

However, the sensor/magnet arrangements integrated in a ball and socket joint cannot be extrapolated to a ball and sleeve joint, because the housing of a ball and sleeve joint has no bottom surface or housing cover facing away from the pivot pin, at which the sensor could be fastened. Furthermore, a flange area, which is provided with a through hole, joins in a ball sleeve at the point at which the magnet is fastened in the joint ball, so that a magnet fastened there would block the through hole.

SUMMARY OF THE INVENTION

However, ball and sleeve joints are increasingly used in the chassis of passenger cars, so that, based on this state of the art, the basic object of the present invention is to create a ball and sleeve joint, by means of which the pivoting and/or rotation of the ball sleeve relative to the housing can be detected.

The ball and sleeve joint according to the present invention for a motor vehicle has a housing and a ball sleeve, which extends out of the housing on both sides, has a through hole and a bearing area, and which is mounted with the bearing area in the housing such that two joint parts that are rotatable and pivotable in relation to one another are formed by the ball sleeve and the housing. A sensor, which interacts with a signal transmitter arranged at the other joint part, is arranged on one of the joint parts, and both the sensor and the signal transmitter are arranged between the through hole and the housing or the housing wall.

The sensor and the signal transmitter together form an angle-measuring system, with which the pivoting and/or rotation of the ball sleeve in relation to the housing can be determined. It has thus become possible to create a ball and sleeve joint, in which an angle-measuring system is integrated, which can be used for control and regulation purposes in the motor vehicle. The integration of the angle-measuring system in the ball and sleeve joint has become possible especially due to the radial arrangement of the sensor and the signal transmitter in relation to the longitudinal axis of the joint and the undeflected ball sleeve.

The sensor may be fastened to the housing and the signal transmitter to the ball sleeve. However, the sensor is preferably arranged in the ball sleeve, especially in the bearing area, whereas the signal transmitter is fastened to the housing. This has the advantage that the signal transmitter, which is regularly dimensioned such that it is larger than the sensor, does not have to be integrated in the ball sleeve, which is relatively thin because of the through hole.

Especially because of the lack of interference susceptibility, magnetic field sensors have proved to be suitable for use as sensors, the signal transmitter being designed as a magnet, which may be an electromagnet or a permanent magnet. The latter does not even require electric wires or power supply and can therefore be mounted in a simple manner. Furthermore, the magnet may be of annular or cylindrical shape and surrounds the ball sleeve especially in the bearing area. Such a magnet may be formed, for example, by a magnetic field spider, in which areas with magnetic poles directed radially in opposite directions alternate in the jacket surface of the magnet around the axis of the cylinder. Magneto-resistive sensors, which are especially suitable for detecting changes in angle between the magnet and the sensor, may be used for the magnetic field sensors.

The ball sleeve may be mounted directly in the housing. However, a bearing sleeve, in which the bearing area of the ball sleeve is mounted, is advantageously provided in the housing, so that the friction properties of the joint can be improved by selecting a suitable material for the bearing shell. The bearing shell may be arranged between the magnet and the ball sleeve, and the bearing shell consists especially of a nonmagnetic material, so that the magnetic field generated by the magnet is not attenuated by the bearing shell and can flow through the sensor arranged in the ball sleeve to a sufficient extent.

The interaction between the magnet and the sensor can also be increased by the magnet being arranged such that it is directly in contact with the inner wall of the housing, which inner wall consists, e.g., of a ferromagnetic material.

The ball sleeve may have a one-part design. However, the ball sleeve preferably comprises an inner sleeve and an outer sleeve arranged concentrically therewith. The outer sleeve can be adapted in this case to the desired friction properties of the joint, whereas the inner sleeve is designed to absorb axial forces. The wall thickness of the outer sleeve may be small. Furthermore, the outer sleeve may be manufactured according to a noncutting forming method, especially as a hydroformed part, so that machining of the surface of the joint area can be eliminated.

The inner sleeve and the outer sleeve may be connected to one another in a nonpositive manner. However, the outer sleeve is preferably fixed at the inner sleeve in a positive-locking manner in the axial direction, so that axial displacement of the outer sleeve relative to the inner sleeve can be reliably prevented from occurring if the outer sleeve and the inner sleeve should have different thermal expansion characteristics. The inner sleeve may have a one-part design. However, to simplify mounting, the inner sleeve preferably has a two-part design, wherein a first inner sleeve part can be pushed into the outer sleeve from one side and the other inner sleeve part from the other side.

A cavity, in which the sensor is arranged, may be formed in the bearing area of the ball sleeve between the inner sleeve and the outer sleeve. The sensor is well protected from external effects in this case. If a magnetic field sensor is used as the sensor, the outer sleeve preferably consists of a nonmagnetic material, which attenuates the magnetic field induced by the magnet as little as possible.

The electric wires for contacting the sensor can be laid between the inner sleeve and the outer sleeve, and an axial groove may be prepared in the inner sleeve to simplify the routing of the wires. The wires, which are led out of the area between the inner sleeve and the outer sleeve especially at one end of the ball sleeve, may also be designed as strip conductors arranged in or on a printed circuit board, in which case the printed circuit board is introduced into the axial groove. Furthermore, an arrangement or a second housing, at which the wires are led out of the area between the inner sleeve and the outer sleeve, may be arranged at the end of the ball sleeve for contacting the sensor. A plug may be integrated in this arrangement, the arrangement being preferably designed as a plug housing.

If the ball and socket joint according to the present invention is used, for example, in the chassis of a motor vehicle, the angle-measuring system may be used, among other things, for level control or for adjusting the headlights.

The present invention will be described below on the basis of a preferred embodiment with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
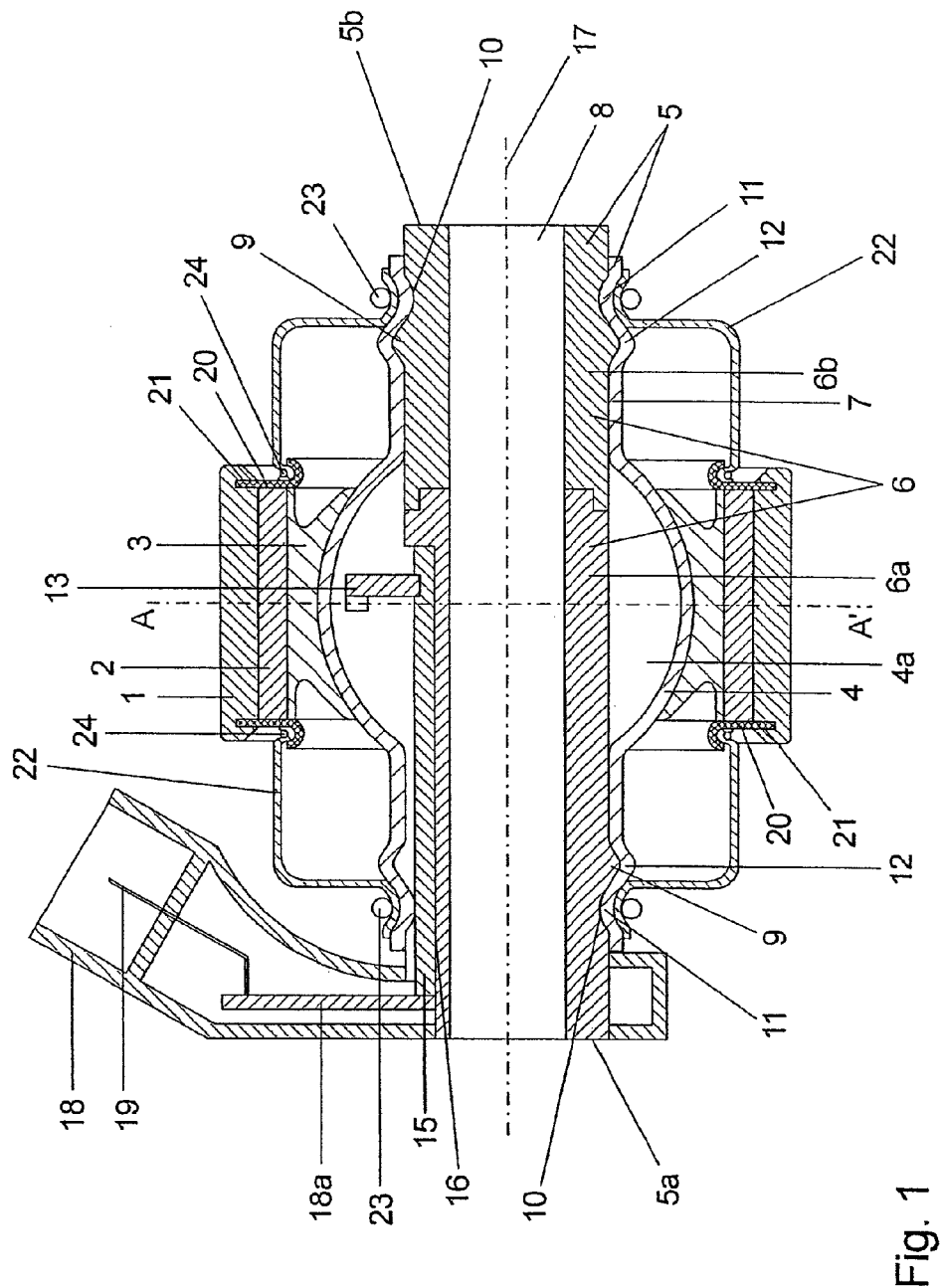
FIG. 1 is a sectional view of an embodiment of the ball and sleeve joint according to the present invention.

Referring to the drawings in particular, FIG. 1 shows an embodiment of the ball and sleeve joint according to the present invention with a magnet 2 and a bearing shell 3 arranged in a housing 1. In the bearing shell 3 a ball sleeve 5 is provided that extends out of the housing 1 on both sides and has a bearing area 4. The ball sleeve 5 is mounted rotatably and pivotably with its bearing area 4. The ball sleeve 5 is composed of a two-part inner sleeve 6 and an outer sleeve 7, which has the spherical bearing area 4. The two parts 6a and 6b of the inner sleeve 6 provided with a through hole 8, have the two end areas or flange areas 5a and 5b of the ball sleeve 5.

The two parts 6a and 6b of the inner sleeve 6 are provided, outside the housing 1, on their outer sides, with an elevation 9 and a depression 10 each, with which an elevation 11 provided on the inner side of the outer sleeve 7 meshes, wherein the elevation 9 meshes with a depression 12 provided on the inner side of the outer sleeve 7, so that the outer sleeve 7 is fixed at the inner sleeve 6 in a positive-locking manner in the axial direction.

A cavity 4a, in which a magnetic field sensor 13, which is designed especially as a magneto-resistive sensor and interacts with the magnetic field generated by the magnet 2, is arranged, is provided in the bearing area 4 between the outer sleeve 7, which is designed especially as a hydroformed part, and the inner sleeve 6. The sensor 13 is connected to electric wires 14 (see FIG. 3), which extend in a printed circuit board 15, which is arranged in an axial groove 16 introduced into the outer surface of the inner sleeve 6. The axial groove 16 extends in parallel to the longitudinal axis 17 of the ball sleeve 5 and extends out of the cavity 4a up to the end area 5a, at which a plug housing 18 is fastened, which has contact surfaces 19, which are connected to the electric wires 14 via a printed circuit board 18a integrated in the plug housing 18, so that the sensor 13 can be contacted via the contact surfaces 19 in the plug housing 18.

The housing 1 has an annular design and consists especially of ferromagnetic steel, and the cylindrical magnet 2 with its outer wall is in contact with the inner wall of the housing 1. The annular bearing shell 3 is arranged in the magnet 2, the magnet 2 and the bearing shell 3 being held in the housing 1 between two closing rings 20, which engage a groove 21 each, which is provided in the inner wall of the housing 1 and can be formed by bending the respective housing edge. A sealing bellows 22 each, which is held via straining rings 23 and 24 at the outer ring 7 and at the closing ring 20, is arranged between the closing rings 20 and the end areas of the outer ring 7.

Figure 2:
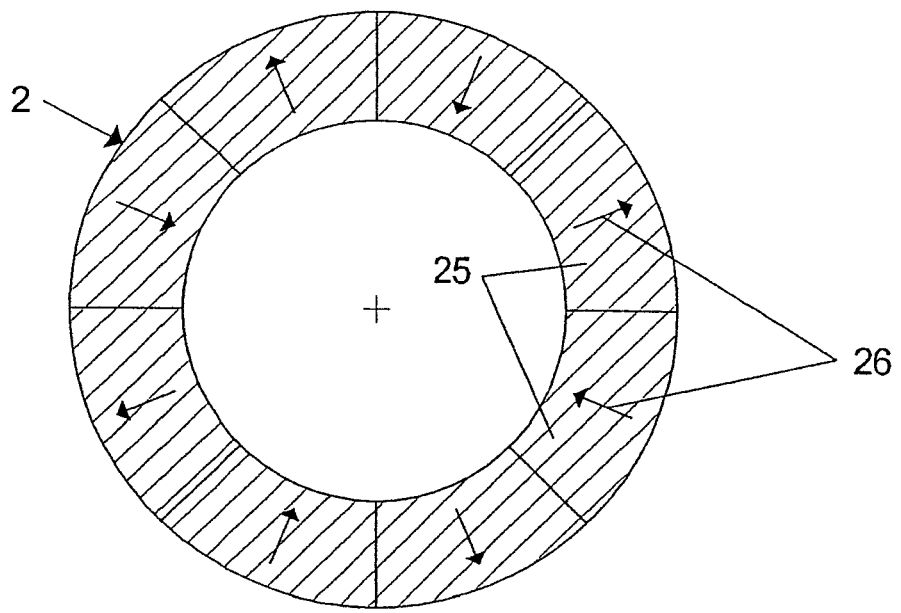
FIG. 2 is a sectional view of the magnet of the embodiment along line A-A' in FIG. 1.

FIG. 2 shows a sectional view of the cylindrical magnet 2 along line A-A' from FIG. 1, which magnet 2 is designed as a field spider. The field spider has a plurality of radially magnetized areas 25, wherein the magnetization of two adjacent areas, which is indicated by an arrow 26, has opposite orientations in the radial direction.

Figure 3:
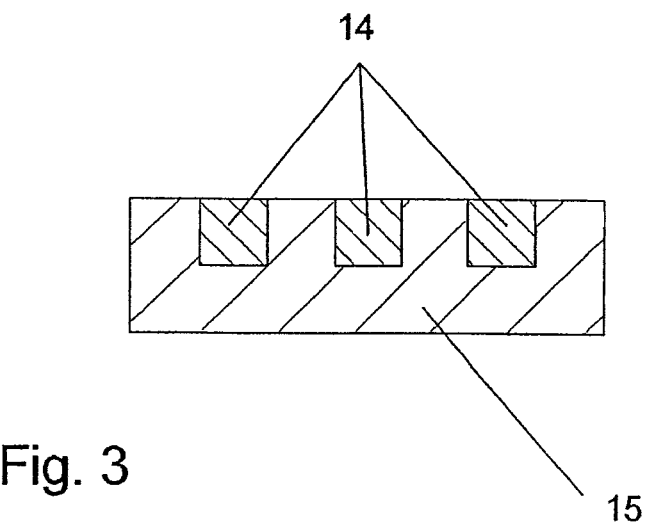
FIG. 3 is a sectional view of the printed circuit board of the embodiment along line A-A' in FIG. 1.

FIG. 3 shows a sectional view of the printed circuit board 15 along line A-A' from FIG. 1, wherein the electric wires 14 are designed as strip conductors that extend within the printed circuit board 15 and are insulated on their surface.

The bearing shell 3 is preferably made of a nonmagnetic plastic and the outer sleeve 7 preferably of a nonmagnetic metal, so that the magnetic field generated by the magnet 2 is attenuated by the bearing shell 3 and the outer sleeve 7 in the area of the sensor 13 as little as possible.

While specific embodiments of the invention have been shown and described in detail to illustrate the application of the principles of the invention, it will be understood that the invention may be embodied otherwise without departing from such principles.

The invention claimed is:

1. A ball and sleeve joint for a motor vehicle, the ball and sleeve joint comprising:
   a housing;
   a ball sleeve extending out of the housing on both sides, said ball sleeve having a through hole and a bearing area and being mounted with said bearing area in the housing such that two joint parts, which are rotatable and pivotable in relation to one another, are formed by the ball sleeve and the housing;
   a signal transmitter arranged at one of said two joint parts;
   a sensor arranged at the other of said two joint parts, which interacts with said signal transmitter arranged at said one of said joint parts; and
   both said sensor and said signal transmitter are arranged between said through hole and said housing.

2. A ball and sleeve joint in accordance with claim 1, wherein said sensor is arranged in said ball sleeve and said signal transmitter in said housing.

3. A ball and sleeve joint in accordance with claim 1, wherein said sensor is arranged in said bearing area of said ball sleeve.

4. A ball and sleeve joint in accordance with claim 1, wherein said signal transmitter is a magnet and said sensor is a magnetic field-sensitive sensor.

5. A ball and sleeve joint in accordance with claim 4, wherein said sensor is a magnetoresistive sensor.

6. A ball and sleeve joint in accordance with claim 4, wherein said signal transmitter is annular.

7. A ball and sleeve joint in accordance with claim 1, wherein a bearing shell made of a nonmagnetic material is arranged between said signal transmitter and said bearing area of said ball sleeve.

8. A ball and sleeve joint in accordance with claim 1, wherein said signal transmitter is in contact with said inner wall of said housing, and comprises a ferromagnetic material.

9. A ball and sleeve joint in accordance with claim 1, wherein said ball sleeve has an inner sleeve and an outer sleeve arranged concentrically therewith.

10. A ball and sleeve joint in accordance with claim 9, wherein said outer sleeve is fixed at said inner sleeve in a positive-locking manner in the axial direction.

11. A ball and sleeve joint in accordance with claim 9, wherein said inner sleeve has a two-part design.

12. A ball and sleeve joint in accordance with claim 1, wherein a cavity, in which said sensor is arranged, is formed in said bearing area of said ball sleeve between said inner sleeve and said outer sleeve.

13. A ball and sleeve joint in accordance with claim 1, wherein electric wires connected to said sensor are laid between said inner sleeve and said outer sleeve.

14. A ball and sleeve joint in accordance with claim 13, wherein an axial groove, in which said electric wires connected to said sensor extend, said axial groove being provided in the surface of the inner sleeve.

15. A ball and sleeve joint in accordance with claim 14, wherein said electric wires are designed as strip conductors of a printed circuit board arranged in said axial groove.

16. A ball and sleeve joint in accordance with claim 14, wherein said electric wires are led out of the area between said inner sleeve and said outer sleeve in an end area of said ball sleeve.

17. A ball and sleeve joint in accordance with claim 16, further comprising: a second housing for contacting said sensor arranged at the end area of said ball sleeve, in which said electric wires are led out of the area between said inner sleeve and said outer sleeve.

18. A ball and sleeve joint in accordance with claim 9, wherein said outer sleeve is manufactured by a forming method without cutting.

19. A ball and sleeve joint in accordance with claim 18, wherein said outer sleeve is a hydroformed part.

20. A motor vehicle ball and sleeve joint comprising:
    a housing;
    a ball sleeve having a through hole and a bearing area and being mounted with said bearing area in the housing extending out of said housing on each of two sides, said ball sleeve being rotatable and pivotable in relation to said housing;
    a signal transmitter arranged at one of said housing and said ball sleeve;
    a sensor arranged at the other of said housing and said ball sleeve, said sensor interacting with said signal transmitter, said sensor and said signal transmitter being arranged between said through hole and said housing.

* * * * *